3,296,188
POLYOLEFIN COMPOSITIONS STABILIZED
WITH HYDRAZONES
Kurt W. Leu, Amsterdam, Netherlands, assignor to Shell
Oil Company, New York, N.Y., a corporation of Delaware
No Drawing. Filed Jan. 10, 1964, Ser. No. 336,864
Claims priority, application Netherlands, Jan. 31, 1963, 288,393
9 Claims. (Cl. 260—45.8)

This invention relates to stabilized polymers of alpha-monoolefins. More particularly, it relates to stabilized compositions and to methods of stabilizing polymers of alpha-monoolefins against degradation caused by oxidation promoted by the presence of metals, such as copper.

Isotactic polypropylene is typical of the polymers stabilized according to this invention. It is well known that it is subject to thermal degradation, but various additives have been devised for inhibiting such degradation to a satisfactory degree. It was found, however, that most of the conventional stabilizing systems for polyolefins are entirely unsatisfactory in the presence of copper. This problem is discussed in a paper, "Inhibition of the Copper Catalyzed Oxidation of Polypropylene," by R. H. Hansen et al., presented at the St. Louis meeting of the American Chemical Society (March 21–30, 1961), Division of Polymer Chemistry, a summary of which is printed on pages 190–195 of the preprints. The problem is summarized as follows:

"Isotactic polypropylene is desirable as a dielectric and structural material because of its high softening point, negligible water absorption, relative hardness, toughness, insensitivity toward thermal embrittlement and stress cracking, and its low density and the accompanying excellent insulating properties. However, it has been found that copper, presumably in an oxidized state, catalyzes the thermal oxidation of polypropylene. The reaction occurs so rapidly in the presence of copper that, even at 1.0% concentrations, thermal antioxidants do not effectively inhibit the degradation. The induction period in oxygen at 140° C. for polypropylene stabilized by the addition of 0.5% by weight of 4,4'-thiobis-(3-methyl-6-tertiary-butyl-phenol) is decreased from about 400 hours to about 35 hours in the presence of copper. In this case about 90% of the effectiveness of the antioxidant is lost if copper is present. In some antioxidant systems, more than 99% of the antioxidant effectiveness is destroyed by the presence of copper."

The authors solved the problem of copper-catalyzed polypropylene degradation by adding to the polypropylene oxamide or its derivatives.

Oxamide and its derivatives have some drawbacks as additives for polyolefins. Obtaining uniform distribution in the polymer is difficult since they are not readily soluble in the polymer. The amount needed to provide protection is relatively high. In the desired amounts, oxamide compounds have adverse effects on the electrical properties of the polymers. Nevertheless, oxamide has been considered an essential additive for commercial uses of polypropylene in applications where it is in contact with copper, such as in coating of electrical wiring.

It is known that polyolefins can be stabilized by the addition of sterically-hindered phenols, i.e., phenols having secondary or tertiary hydrocarbon radicals in one or both of the ortho positions with respect to the hydroxy groups. The most effective phenols are those described in U.S. Patent No. 3,026,264 to Rocklin et al. These phenols can be described by generic Formula I wherein R represents an alkyl group of from 3 to 10 carbon atoms branched at the alpha position and R' represents an alkyl group of from 1 to 4 carbon atoms.

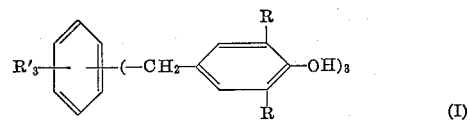

A preferred phenol is that where R is a tert-butyl group and R' is a methyl group.

The stabilizing effect of the above sterically-hindered phenols is, nevertheless, unsatisfactory if the polypropylene composition is in contact with copper, e.g., polypropylene material used for purposes of insulating electrical cables, due to the amount of phenol required. Copper has a catalytic effect on the degradation of polypropylene. It has been found that the degradation period of uninhibited polypropylene when in the presence of 1.4% copper dust is decreased by a factor of three over uninhibited polypropylene under the same conditions in the absence of copper. To state the relationship in another way, the effect copper has on polypropylene, inhibited against degradation, is to decrease to one-third the effectiveness of the stabilizer. Thus, to obtain satisfactory stabilization of polypropylene in the presence of copper with a sterically-hindered phenolic compound, as described above, the concentration of the phenol must necessarily be increased three-fold. Unfortunately, at this higher concentration of the phenol, polypropylene becomes discolored. The discoloration of the polypropylene composition renders it unsuitable for certain purposes, such as copper wire insulation, wherein a color code is to be affixed to the insulation. Also, a clear insulation has more aesthetic appeal and thus, commercial value.

It is an object of this invention, therefore, to provide novel compositions which are stabilized against degradation in the presence of metals and, in particular copper. A further object of the invention is to provide a composition comprising a poly-alpha-monoolefin and inhibitors, characterized in that (1) relatively small amounts of the inhibitors need be used and (2) the compositions possess satisfactory electrical qualities. Other objects will be apparent from the following description of the invention.

It has now been found that a fully satisfactory stabilization of the polymers, and in particular polypropylene, is obtained when they are in contact with metals by incorporating with the polymer, in addition to the phenol, hydrazone compounds containing as a substituent a six-membered heterocyclic nitrogen radical.

If one desires, an organic sulfide compound may be incorporated into the composition in addition to the hydrazone and phenol. In some cases the addition of the sulfur compound increases the stability of the composition.

While the applicant does not allege to known the precise chemical role which the hydrazone plays in the composition, it appears to form complexes which tie up the copper ions. The hydrazone, therefore, increases the effectiveness of the inhibitors.

Accordingly, this invention is directed toward poly-alpha-olefin compositions of superior stability against degradation in the presence of metals. These compositions comprise a poly-alpha-olefin, a hydrazone, a phenol and may or may not contain an organic sulfide compound. The components of the composition are described in detail below.

Polymers

The polymers which can be stabilized according to this invention are normally solid plastic polymers of alpha-monoolefins which can be prepared at low temperatures and pressures in the presence of certain catalyst compositions which are commonly referred to as "Ziegler-type" catalysts, "low pressure catalysts," or "coordination catalysts."

Polymers produced by use of such catalysts are characterized by a high degree of regularity of their molecules and are termed "isotactic, stereoregular, crystallizable, crystalline, linear, low pressure, or "Ziegler" polymers.

A particularly useful low-pressure polymer is highly crystalline or crystallizable polypropylene. It is characterized, among other things, by a high melting point, i.e., in the order of about 170° C. and improved tensile strength. Although there are various ways of distinguishing this polypropylene from the prior art amorphous type of polypropylene, it is convenient to characterize the crystalline polymer by the proportion of polymer which is insoluble in heptane, amorphous polypropylene being soluble therein. Low-pressure polypropylene prepared with preferred Ziegler type catalysts contains as much as 90 to 98% heptane insoluble polymer.

The inhibitor systems of this invention are useful in linear polymers of olefins of from 2 to 8 carbon atoms per molecule, including ethylene, butene-1, 4-methylpentene-1 and hexene-1 and in crystalline copolymers of propylene with ethylene, butene-1 and the like and block copolymers of alpha-olefins. While this invention thus applies to polymers of various alpha-monoolefins, the description is directed mainly to polypropylene. It has been found that polypropylene is particularly readily attacked and degraded in the presence of copper. Also, inhibitor systems which are satisfactory under other conditions and in some of the polyolefins, e.g., polyethylene, are often unsatisfactory in polypropylene and are generally unsatisfactory in the presence of copper. On the other hand, inhibitor systems satisfactory in polypropylene in the presence of copper will usually also be satisfactory in other low-pressure polymers, even under similar conditions, such as in the presence of copper. The invention will therefore be explained by reference to stabilization of polypropylene.

Reactants, catalysts, and conditions useful in the production of Ziegler type low-pressure polyolefins are known in prior art. Early references, are, for example, Belgian Patents Nos. 534,792 and 538,782 to Ziegler and Ziegler et al., respectively. A great variety of suitable catalysts and conditions for their use have since been described. Suitable catalysts can be selected from the reference listed on pages 350–361 of "Linear and Stereoregular Addition Polymers," by Gaylord and Mark, Interscience Publishers, Inc., New York, 1959. Catalysts which are particularly suitable for production of highly crystalline polypropylene, and their use, are described in U.S. Patent 2,971,925 to Winkler et al.

In general, suitable coordination catalysts comprise the reaction product of (1) a compound of a transition metal selected from the metals in subgroups "a" of groups IV, V and VI and from group VIII metals of the Mendeleev Periodic Table as illustrated on page 28 of Ephraim, "Inorganic Chemistry," 6th English edition, with a reducing compound which is generally a hydride or a metal-organic compound of a metal from groups I–III of the Periodic Table.

The preferred transition metals whose compounds are used for producing various types of low-pressure polymers are titanium, vanadium and chromium. Titanium trichloride is a particularly preferred compound. Other suitable metals include zirconium, hafnium, tellurium, columbium, tantalum, molybdenum, cobalt, and nickel. The preferred reducing compounds are aluminum alkyls, particularly aluminum trialkyls and dialkyl aluminum halides having up to 12 carbon atoms per alkyl group. Lower alkyl groups, such as ethyl, isopropyl and isobutyl are preferred. The preferred halogen element is chlorine.

Phenol

The sterically-hindered phenols which are useful in this invention are of the general formula

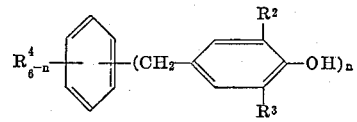

(II)

wherein $R^4$ is selected from hydrocarbon radicals, hydroxy groups, halide atoms and hydrogen atoms. The hydrocarbon radicals include aliphatic, cycloaliphatic, aromatic, aliphatic-aromatic and may be saturated or unsaturated, $R^2$ is a member selected from secondary and tertiary hydrocarbon radicals and a cyclohexyl radical, $R^3$ is a member selected from secondary and tertiary hydrocarbon radicals, a cyclohexyl radical, and a hydrogen atom and $n$ is a positive integer, preferably from 1 to 3. $R^2$ and $R^3$ are preferably a lower alkyl group of from 1 to 5 carbon atoms. Examples of suitable $R^2$ and $R^3$ substituents which give rise to the steric hindrance of the phenols are isopropyl, tert-butyl, tert-pentyl, norbornyl, isobornyl and cyclohexyl radicals.

A particularly desirable phenolic compound is that of the formula

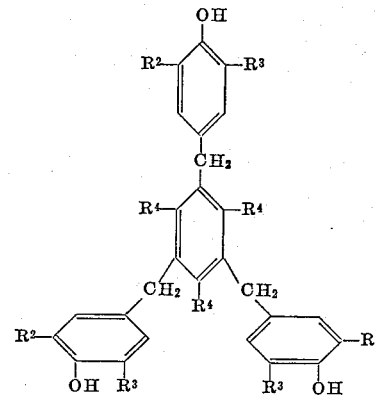

(III)

wherein $R^2$, $R^3$ and $R^4$ are as previously defined.

Other phenols suitable for use in the compositions of this invention are those conforming to the formula

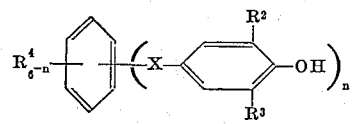

(IV)

wherein $R^2$, $R^3$ and $n$ are as previously defined and X is a member selected from —O—, —S—, —NH—,

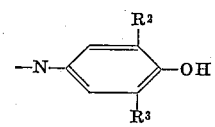

and —$C_mH_{2m}$—, in which $m$ is at least 2.

Thus, generically the phenols of this invention can be represented by the formula

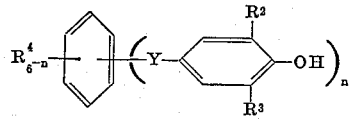

wherein $R^2$, $R^3$, $R^4$ an $n$ are as previously defined and Y is selected from a —$CH_2$— group and X where X is as defined above.

The preferred species of the sterically-hindered phenols is 1,3,5-trimethyl-2,4,6-tris(3,5-ditertiary-butyl-4-hydroxybenzyl)benzene. This compound is known and described in U.S. Patent No. 3,026,264 to Rocklin et al.

Representative of other suitable phenols are the following 1,3,5-triethyl-2,4,6-tris(3,5-di-isopropyl-4-hydroxybenzyl) benzene;
1,3,5-trimethyl-2,4-di(3,5-di-cyclohexyl-4-hydroxybenzyl) benzene; and
1,3,5-trimethyl-2,4,6-tris(3,5-di-norbornyl-4-hydroxybenzyl)benzene;
1,2,4-trimethyl-3,5,6-tris(3-methyl-5-isopropyl-4-hydroxybenzyl)benzene;
1,2,4-trioctyl-2,3,5-tris(3-hexyl-5-tert-amyl-4-hydroxybenzyl)benzene;
1,2-dimethyl-5-ethyl-3,4,6-tris(3-amyl-5-tert-butyl-4-hydroxybenzyl)benzene;
1,2,4-trimethyl-3,5,6-tris(3-methyl-5-isopropyl-4-hydroxybenzyl)benzene; and
1,2-dimethyl-5-ethyl-3,4,6-tris(3-amyl-5-tert-butyl-4-hydroxybenzyl)benzene.

*Hydrazones*

The hydrazones used in the compositions of this invention are characterized in that at least one substituent thereof is a heterocyclic nitrogen radical. These hydrazones are generically represented by the formula

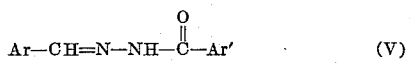

wherein Ar is selected from

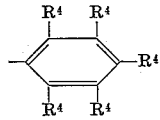

and radicals wherein one or more of the —CR$^4$= groups of the above-referred-to radical have been replaced by a corresponding number of —N= groups, Ar$^1$ is selected from

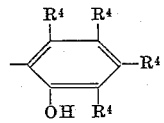

and radicals wherein one or more of the —CR$^4$= groups of the

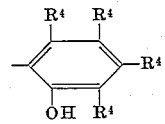

radical have been replaced by a corresponding number of —N= groups, further characterized in that at least one heterocyclic nitrogen atom and preferably less than three are present in the hydrazone compound. R$^4$ has the same significance as before. Ar or Ar$^1$ may also be condensed nuclei, such as naphthyl.

Examples of hydrazones suitable for use in this invention are the following:

2-methyl-benzaldehyde 3-hydroxy-5-methylisonicotinoylhydrazone;
2-chloro-4-methylbenzaldehyde 3-hydroxyisonicotinoylhydrazone;
2-ethyl-4-hydroxbenzaldehyde 4-hydroxnicotinoylhydrazone;
2-hydroxybenzaldehyde 3-hydroxyisonictinoylhydrazone;
2,6-dihydroxy-4-chlorobenzaldehyde 3,5-dihydroxyisonicotinoxylhydrazone;
4-hydroxybenzaldehyde 3-hydroxyisonicotinoylhydrazone;
2,4-dihydroxy-3,5-di-tert-butyl-benzaldehyde 2-tert-butyl-3-hydroxyisonicotinoylhydrazone;
2-hydroxybenzaldehyde 3-hydroxy-2-pyrazinecarboxyloylhydrazone;
4-chlorobenzaldehyde 3-hydroxynicotinoylhydrazone;
pyridine-4-carboxyaldehyde 2-hydroxynicotinoylhydrazone;
3-hydroxypyridine-4-carboxaldehyde 3-hydroxyisonicotinoylhydrazone;
3-hydroxypyridine-4-carboxaldehyde solicyloylhydrazone; and
3-hydroxy-5-methylpyridine-4-carboxaldehyde solicyloylhydrazone.

A preferred hydrazone for use in this invention is hydroxybenzaldehyde 3-hydroxyisonicotinoylhydrazone of the formula

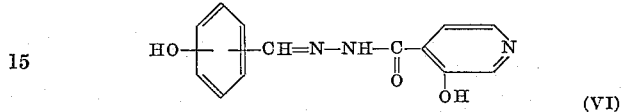

The above-described benzaldehyde nicotinoylhydrazones are prepared by refluxing a mixture of a benzaldehyde and a nicotinic acid hydrazide in ethyl alcohol, filtering off the product and recrystallizing the corresponding benzaldehyde nicotinoylhydrazone from ethyl alcohol.

*Single compound combining function of phenol and hydrazone*

A modification of the invention involves selecting a hydrazone which contains sterically-hindered phenolic groups. Hydrazones of this description may then be incorporated with the polymer without additional inhibitors. Hydrazones containing the sterically-hindered phenolic groups are those of the formula

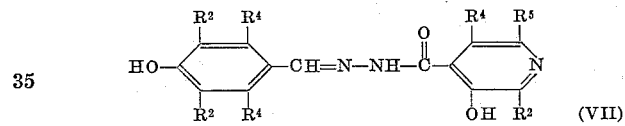

wherein R$^2$ and R$^4$ are as defined previously and R$^5$ is selected from R$^2$ and R$^4$ radicals with the proviso that when R$^4$ contained in the isonicotinoyl radical is a hydroxy group, then R$^5$ is a R$^2$ radical. Examples of compounds conforming to Formula VII are the following:

4-hydroxy-3,5-di-tert-butylbenzaldehyde 2-tert-butyl-3-hydroxyisonicotinoylhydrazone;
2,4-dihydroxy-3,5-di-tert-butylbenzaldehyde 2,6-di-tert-butyl-3,5-dihydroxyisonicotinoylhydrazone;
3,5-di-tert-pentyl-4-hydroxybenzaldehyde 2-tert-isopropyl-3-hydroxyisonicotinoylhydrazone, etc.

*Organic sulfides*

The organic sulfides which are suitable in carrying out this invention are of the formula

wherein R$^6$ is selected from a hydrocarbon radical, preferably an alkyl radical of from 8 to 25 carbon atoms or a hydroxy-substituted alkyl radical of from 8 to 25 carbon atoms, cycloalkyl and thiuram radicals, and $p$ is an integer selected from 1 and 2. The R$^6$ radicals may be similar or dissimilar hydrocarbon radicals. Examples of compounds conforming to Formula VIII are dicetyl sulfide, cetyl dodecyl sulfide, didodecyl sulfide, dieicosyl sulfide, di-n-dodecyl disulfide, thiuram disulfide,
tetraethyl thiuram disulfide,
bis(omega-hydroxycetyl)monosulfide,
bis(beta, gamma-dihydroxylauryl)monosulfide and
bis(delta-hydroxydodecyl)monosulfide.

Other suitable organic sulfides are those of the formula

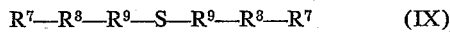

wherein R$^7$ is a hydrocarbon radical, preferably an alkyl radical of from 8 to 25 carbon atoms, R$^8$ is a carbonyloxy group, e.g.,

and $R^9$ is a divalent hydrocarbon radical, such as an alkylene of form 1 to 25 carbon atoms. It is apparent that the oxy atom of the carbonyloxy group can be attached to either $C^7$ or $C^9$ and further that $C^7$ and $C^9$ may be similar or dissimilar hydrocarbon radicals. Particularly preferred are dialkyl esters of beta thio dipropionic acid, wherein the alkyl group has from 12 to 20 carbon atoms. Examples of compounds corresponding to Formula IX are dilauryl thiodipropionate, distearyl thiodipropionate, dilauryl thio-bis(alpha-menthylpropionate), distearyl thiodibutyrate, mono- and didodecanoic esters of thioglycol, and esters of aliphatic monocarboxylic acids of from 8 to 30 carbon atoms and the following sulfides:

bis(beta,gamma-dihydroxypropyl)monosulfide;
bis(gamma-hydroxypropyl)monosulfide;
bis(delta-hydroxybutyl)monosulfide;
bis(delta,gamma-dihydroxybutyl)monosulfide; and
bis(delta,gamma-dihydroxypropyl)monosulfide.

The aliphatic monocarboxylic acids may be saturated or unsaturated and either unbranched, branched or cylic. It is recommended that the branched acids be branched at the alpha or beta position. Representative of the aliphatic mono-carboxylic acids are cupric, lauric, alpha-methyllauric, myristic oleic, linoleic, eleostearic, margaric, arachidic, behenic, cyclopentyl propionic acids, and the like.

The quantities of organic sulfides, hydrazones and phenolic compounds incorporated into the polymer may vary depending upon the stability of the composition desired. Generally, the following amounts are incorporated into the polymer from about 0.01% to 5% and preferably 0.2% to 1% by weight of the hydrazone; from 0.01% to 1% and preferably 0.05% to 0.5% by weight of the phenol; and from 0.01% to 5% and preferably 0.05% to 1% by weight of the sulfide. When a hydrazone containing sterically-hindered phenolic groups is incorporated, from about 0.1% to 5% by weight and preferably from 0.2% to 1% by weight is added to the polymer. Percent by weight is with reference to the polymer to be stabilized.

The stabilizers used in accordance with this invention may be admixed with the polyolefin by any of the usual procedures for incorporating an antioxidant uniformly in a solid material to form a homogeneous composition. A simple method is to dissolve the antioxidants in a low-boiling solvent such as acetone or hexane, etc., and, then after thoroughly mixing the stablizer solution with the polymer in flake or other such form, evaporating the solvent to obtain a homogenous blend. Another method is to incorporate the antioxidants by various means of mechanical mixing, etc., as for example, dry mixing to form a homogenous blend and then extruding into molding powder, fiber, film, etc.

The stabilizers of this invention may be used in combination with other stabilizers such as ultraviolet light absorbers, antiacids such as calcium soaps or other antioxidants. Other materials may also be incorporated in the polymer as, for example pigments, dyes, fillers, etc.

The compositions of this invention have outstanding utility as coatings for metals. They are particularly useful for coating copper wiring and cables whereby the coating must withstand degradation for extended periods of time at ambient temperatures.

The invention is illustrated by but not limited to the following examples.

EXAMPLE

Experiments were carried out with a polypropene that had been prepared with the aid of a catalyst system composed of titanium trichloride and aluminum diethyl chloride and having an intrinsic viscosity of 3.4, determined at 135° C. in decahydronaphthalene.

The polymer powder was mixed with the stabilizer and milled for five minutes at 180° C. From the sheet obtained by milling, slices of 0.5 mm. thickness were pressed at 230° C. Then, at 210° C., sandwiches were pressed, consisting of two slices of the polymer composition with a layer of copper gauze between them. The sandwiches were kept at 130° C. in a drying oven exposed to the atmosphere. The table below gives the number of days (the so-called oven life) at the end of which the composition was found to be brittle.

The stabilizers used were:

(I) 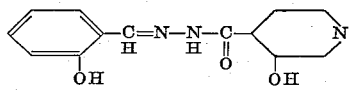

(II) 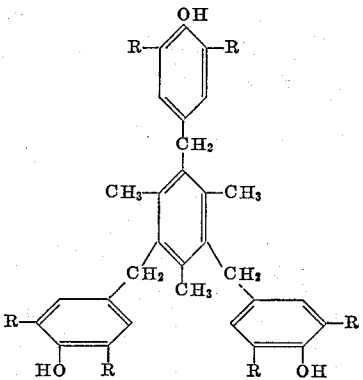

where R=tert-butyl.

| Example | Stabilizer | Quantity, percent w. | Oven life, days |
|---|---|---|---|
| 1 | I | 0.5 | 8 to 10 |
| 2 | II | 0.1 | 1 to 2 |
| 3 | I+II | 0.5+0.1 | >150 |

Similar results are also obtained when a polymer of ethylene, butene-1,4-methyl-pentene-1, hexene-1, or a crystalline copolymer of propylene with ethylene is substituted for polypropylene in Examples 1 to 5.

Similar results are also obtained when other hydrazones and phenols are used in place of those in the preceding examples.

The hydrazones which give similar results are the following:

2-methylbenzaldehyde 3-hydroxy-5-methylisonicotinoyl-hydrazone;
2-ethyl-4-hydroxybenzaldehyde 4-hydroxynicotinoyl-hydrazone;
2,6-dihydroxy-4-chlorobenzaldehyde 3,5-dihydroxyiso-nicotinoylhydrazone; and
3-hydroxypyridine-4-carboxaldehyde-3-hydroxyiso-nicotinoyhydrazone; and
3-hydroxypyridine-4-carboxaldehyde salicyloylhydrazone.

The phenols which give similar results are the following: 1,3,5 - triethyl-2,4,6-tris(3,5 - di-isopropyl-4-hydroxybenzyl)benzene; 1,3 - di - methyl-5-ethyl-2,4-di(3,5-cyclohexyl-4-hydroxybenzyl)benzene; 1,3,5-trimethyl-2,4,6-tris (3,5-di-norbornyl-4-hydroxybenzyl)benzene; and 1,2,4,5-tetramethyl - 3,6 - di(3,5 - di-tert-butyl-4-hydroxybenzyl)-benzene.

I claim as my invention:

1. A polyolefin composition stabilized against degradation when in contact with copper comprising
(1) a solid polymer of an alpha-monoolefin of from 2 to 8 carbon atoms per molecule combined with
(2) a combination of inhibitors against degradation thereof consisting of;
(a) from 0.01% to 5% by weight with reference to the polymer of a hydrazone having the formula

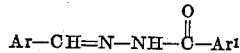

wherein, Ar is selected from the group consisting of

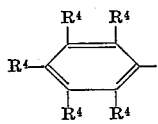

and radicals wherein from 1 to 3 of the —CR$^4$= groups of the

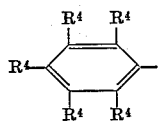

radical have been replaced by —N= groups wherein R$^4$ is a member selected from the group consisting of hydrocarbon radicals, hydroxy groups, halide atoms and hydrogen atoms, Ar$^1$ is selected from the group consisting of

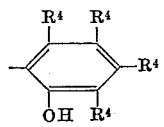

and radicals in which from 1 to 3 =CR$^4$ groups of the

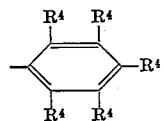

radical have been replaced by =N— groups wherein R$^4$ is as defined before, the hydrazone being further characterized in that at least one heterocyclic nitrogen atom is present;

(b) from 0.01% to 1% by weight with reference to the polymer of a phenol having the formula

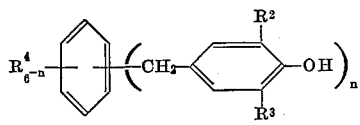

wherein, R$^4$ is selected from hydrocarbon radicals, hydroxy groups, halide atoms and hydrogen atoms, is a member selected from secondary and tertiary hydrocarbon radicals and a cyclohexyl, R$^3$ is a member selected from R$^2$ and a hydrogen atom and n is selected from 1 to 3; and (c) from 0 to 5% by weight with reference to the polymer of an organic sulfide selected from the group consisting of R$^6$—S$_p$—R$^6$ and

R$^7$—R$^8$—R$^9$—S—R$^9$—R$^8$—R$^7$ wherein R$^6$ and R$^7$ are monovalent hydrocarbon radicals, R$^8$ is carbonyloxy group, R$^9$ is a divalent hydrocarbon radical and $p$ is an integer selected from 1 and 2.

2. A composition according to claim 1 wherein the hydrazone is a benzaldehyde hydroxyisonicotinoylhydrazone.

3. A compositoion according to claim 2 wherein the phenol is 1,3,5-trimethyl-2,4,6-tris(3,5-di-tert-butyl-4-hydroxybenzyl)benzene.

4. A composition according to claim 1 wherein the sulfide is a compound of the formula

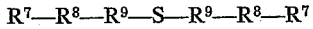

5. A composition according to claim 1 wherein the phenol is of the formula

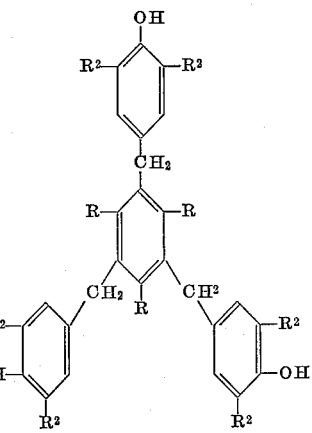

wherein R is a lower alkyl radical and R$^2$ is a member selected from secondary and tertiary hydrocarbon radicals and a cyclohexl.

6. A composition according to claim 3 wherein no sulfide is present.

7. A composition according to claim 6 wherein the polymer is polypropylene.

8. A polyolefin composition stabilized against degradation when in contact with copper comprising (1) polypropylene, (2) from 0.01% to 5% of 2-hydroxybenzaldehyde 3-hydroxyisonicotinoylhydrazone and (3) from 0.01% to 1% of 1,3,5-trimethyl-2,4,6-tris(3,5-di-tert-butyl-4-hydroxybenzylbenzene wherein the percent of components (2) and (3) is percent by weight with references to the polypropylene.

9. A polyolefin composition stabilized against degradation when in contact with copper comprising polypropylene and about 0.5% and 0.1% by weight with reference to the polypropylene of 2-hydroxy-benzaldehyde 3-hydroxyisonicotinoylhydrazone and 1,3,5-trimethyl-2, 4,6-tris(3,5-di-tert-butyl-4-hydroxybenzyl)benzene, respectively.

References Cited by the Examiner

UNITED STATES PATENTS

| 3,026,264 | 3/1962 | Rocklin et al. | 260—45.75 X |
| 3,110,696 | 11/1963 | Dexter | 260—45.8 |
| 3,180,850 | 4/1965 | Van Schooten et al. | 260—45.95 |
| 3,236,805 | 2/1966 | Caldo | 260—45.85 |

LEON J. BERCOVITZ, *Primary Examiner.*

W. J. WELSH, *Assistant Examiner.*

UNITED STATES PATENT OFFICE
CERTIFICATE OF CORRECTION

Patent No. 3,296,188  
January 3, 1967

Kurt W. Leu

It is hereby certified that error appears in the above numbered patent requiring correction and that the said Letters Patent should read as corrected below.

Column 9, line 26, for "$=CR^4$" read -- $=CR^4-$ --; line 48, after "atoms," insert -- $R^2$ --.

Signed and sealed this 26th day of September 1967.

(SEAL)
Attest:

ERNEST W. SWIDER  
Attesting Officer

EDWARD J. BRENNER  
Commissioner of Patents